United States Patent
Ito et al.

(10) Patent No.: US 8,711,936 B2
(45) Date of Patent: Apr. 29, 2014

(54) METHOD OF AND APPARATUS FOR RECORDING MOTION PICTURE, WHICH GENERATE ENCODED DATA WITH HIGHER COMPRESSION EFFICIENCY USING A MOTION VECTOR SIMILARITY

(75) Inventors: Hiroaki Ito, Yokohama (JP); Tomokazu Murakami, Kokubunji (JP); Isao Karube, Fujisawa (JP); Masashi Takahashi, Yokohama (JP); Yuto Komatsu, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 1486 days.

(21) Appl. No.: 12/108,025

(22) Filed: Apr. 23, 2008

(65) Prior Publication Data

US 2008/0267292 A1    Oct. 30, 2008

(30) Foreign Application Priority Data

Apr. 27, 2007 (JP) ................. 2007-117962

(51) Int. Cl.
*H04N 7/12* (2006.01)
(52) U.S. Cl.
USPC .................................................. 375/240.16
(58) Field of Classification Search
USPC .................................................. 375/240.16
See application file for complete search history.

(56) References Cited

U.S. PATENT DOCUMENTS

| 5,731,840 A | 3/1998 | Kikuchi et al. |
| 2004/0081238 A1* | 4/2004 | Parhy ........................ 375/240.16 |
| 2005/0129125 A1* | 6/2005 | Cha et al. ................. 375/240.16 |
| 2007/0147690 A1* | 6/2007 | Ishiwata ....................... 382/232 |

FOREIGN PATENT DOCUMENTS

| JP | 9-154138 | 6/1997 |
| JP | 2005-124001 | 5/2005 |

* cited by examiner

*Primary Examiner* — Sath V Perungavoor
*Assistant Examiner* — James Pontius
(74) *Attorney, Agent, or Firm* — Antonelli, Terry, Stout & Kraus, LLP.

(57) ABSTRACT

A motion picture recording apparatus that includes a similar-motion-area setup unit which sets up blocks having a similar motion vector as a similar motion area, the similar motion vector being included in motion vectors calculated by a block-based motion search unit. The recording apparatus also includes a representative-motion-vector calculation unit which calculates a representative motion vector by use of a motion vector provided by each block included in the similar motion area. The recording apparatus further includes a selection unit which selects either the representative motion vector or the motion vector provided by each block, which is to be used for each block in the similar motion area. The recording apparatus also includes an encoder which performs coding processing using the selected motion vector and a prediction picture, for each block in the similar motion area.

11 Claims, 13 Drawing Sheets

(40)

METHOD OF AND APPARATUS FOR RECORDING MOTION PICTURE, WHICH GENERATE ENCODED DATA WITH HIGHER COMPRESSION EFFICIENCY USING A MOTION VECTOR SIMILARITY

CLAIM OF PRIORITY

The present application claims priority from Japanese application serial No. JP 2007-117962, filed on Apr. 27, 2007, the content of which is hereby incorporated by reference into this application.

BACKGROUND OF THE INVENTION (1) Field of the Invention

The present invention relates to a method of and an apparatus for recording motion pictures.

(2) Description of the Related Art

JP-A-2005-124001 discloses a motion picture coding technique which splits a frame of a motion picture to be subjected to coding on a block basis and generates a prediction picture for each block from a reference picture and a motion vector to each reference picture of each block. In this disclosure, a plurality of blocks are split into a plurality of areas based on the motion vector similarity; a prediction vector is derived from motion vectors provided by blocks in respective area; and a differential vector, representing a difference between the motion vector and the prediction vector, is derived and outputted for each block.

Further, H.264/AVC (Advanced Video Coding) standard, etc. is prescribed as a method of coding, recording, and transmitting motion picture data with high efficiency. Here, a calculation method of a prediction vector is prescribed on pages 147 and 148 (Equations 8-208 and 8-209, respectively) of "ITU-T Rec. H.264 "Advanced Video Coding for generic audiovisual services" (March 2005).

SUMMARY OF THE INVENTION

The motion picture coding technique disclosed in JP-A-2005-124001 aims at reducing the amount of encoded data by splitting a plurality of blocks into a plurality of areas based on the motion vector similarity, deriving a prediction vector from motion vectors provided by blocks in each area, and coding the difference between the motion vector and the prediction vector. However, such a method of deriving a prediction vector is not prescribed in any existing coding standard, such as H.264/AVC. Accordingly, there has been a problem that data coded by the motion picture coding technique disclosed in JP-A-2005-124001 cannot be decoded by a decoder supported by an existing coding standard.

The present invention attains a method of and an apparatus for recording a motion picture, which generates encoded data that can be decoded even by a decoder supported by an existing coding standard while improving the compression efficiency by use of the motion vector similarity.

A mode of the present invention may be configured as described within the ambit of the appended claims.

In accordance with the present invention, it becomes possible to attain a method of and an apparatus for recording a motion picture, which generate encoded data with higher compression efficiency that can be decoded even by a decoder supported by an existing coding standard.

BRIEF DESCRIPTION OF THE DRAWINGS

These and other features, objects and advantages of the present invention will become more apparent from the following description when taken in conjunction with the accompanying drawing wherein.

DETAILED DESCRIPTION OF THE PREFERRED EMBODIMENTS

Figure 1:
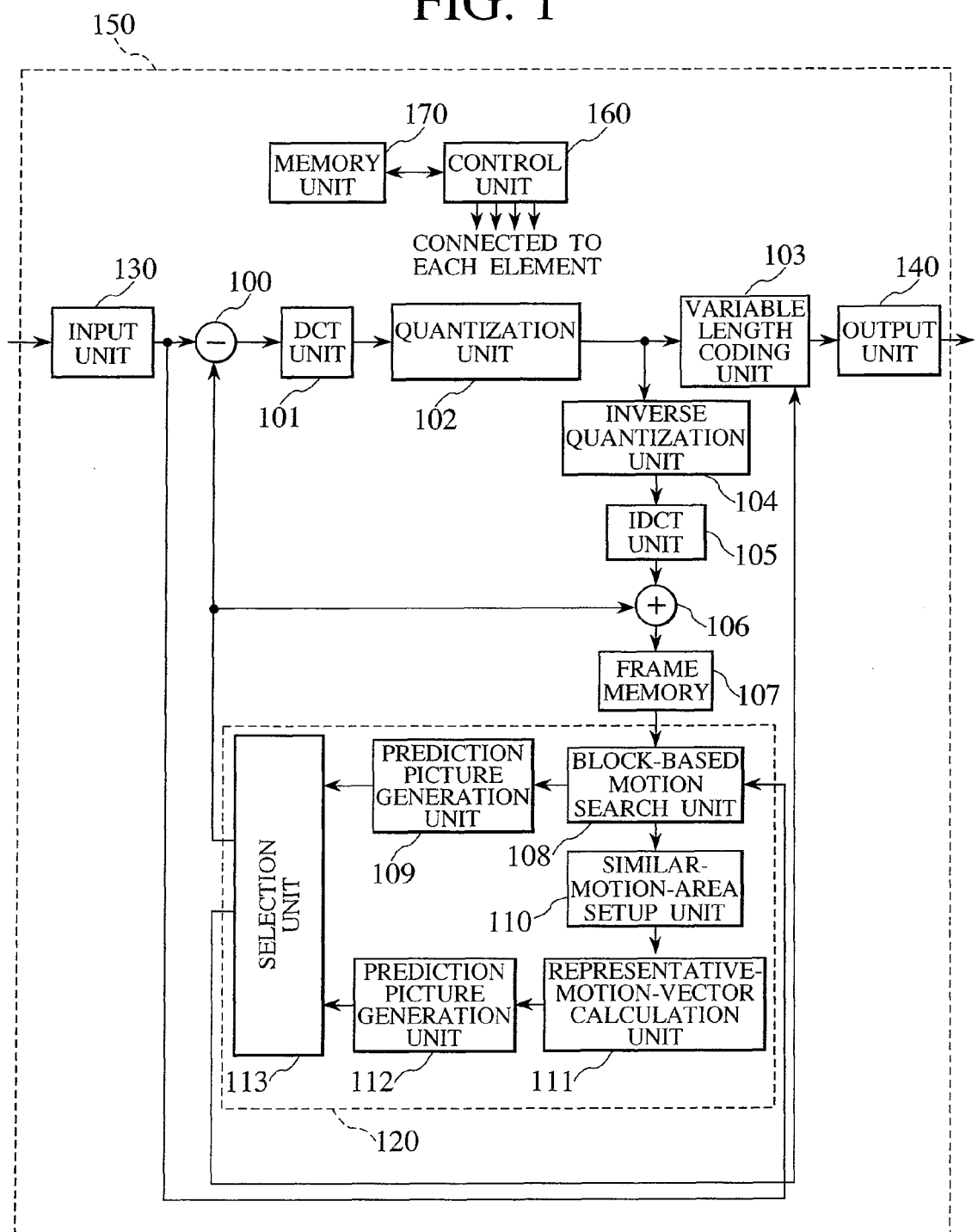
FIG. 1 is a block diagram showing an example of an encoder configuration according to the present embodiment.

Embodiments of the present invention will be explained below with reference to the accompanying drawings. It is premised that, in each drawing, components assigned the same reference numeral are given the same function. An expression "step" in each statement and a flow chart in each drawing of the present description will be suitably abbreviated to notation "S." "Amount of generated codes" in each statement and each drawing of the present description denotes the amount of data after picture coding by a method and an apparatus according to an embodiment. Each of "conventional coding processing", "conventional motion search", and "conventional motion vector" shown in each description and each drawing of the present description is related to coding processing that does not perform motion vector replacement with a representative vector.

Figure 12:
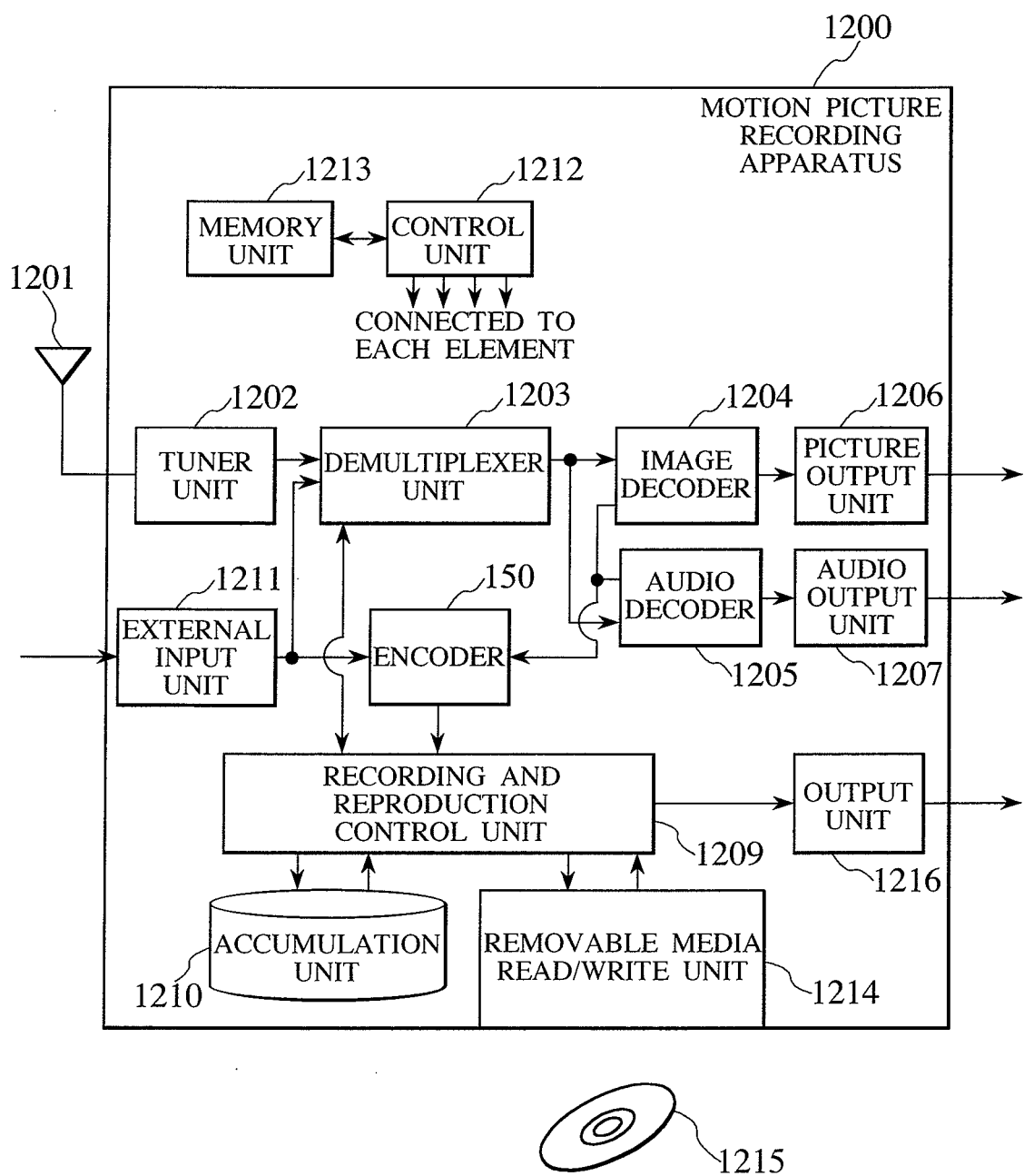
FIG. 12 is a block diagram showing the configuration of a motion picture recording apparatus according to an embodiment of the present invention.

FIG. 12 is a block diagram of the configuration of the motion picture recording apparatus according to an embodiment of the present invention. A motion picture recording apparatus 1200 of FIG. 12 includes, for example, a tuner unit 1202, a demultiplexer unit 1203, an image decoder 1204, an audio decoder 1205, a picture output unit 1206, an audio output unit 1207, an encoder 150, a recording and reproduction control unit 1209, an accumulation unit 1210, an external input unit 1211, a control unit 1212, and a memory unit 1213.

Operations of the motion picture recording apparatus 1200 will be explained below. The operation of each component of the motion picture recording apparatus 1200 may be, for example, an autonomous operation thereof as described below. Further, it is also possible that the control unit 1212 included in the motion picture recording apparatus 1200 attains the operation of each component in cooperation with software stored in the memory unit 1213.

First of all, the reproduction operation by the motion picture recording apparatus 1200 will be explained below. If a signal to be subjected to reproduction is a broadcast signal, a signal from an antenna 1201 for receiving broadcast wave containing a television signal, etc. is inputted to the tuner unit 1202. The tuner unit 1202 subjects the inputted signal to modulation. Further, if a signal to be subjected to reproduction is an external input signal, the signal is inputted to the external input unit 1211 from an external apparatus connected to the motion picture recording apparatus 1200.

The demultiplexer unit 1203 separates required coding streams from the signal demodulated by the tuner unit 1202 or the signal inputted to the external input unit 1211. Image-related coding streams included in the coding streams separated by the demultiplexer unit 1203 are decoded and reproduced by the image decoder 1204. An image signal reproduced by the image decoder 1204 is outputted by the picture output unit 1206 to an image reproducing apparatus connected outside. Sound-related coding streams included in the coding streams separated by the demultiplexer unit 1203 are decoded and reproduced by the audio decoder 1205. An audio signal reproduced by the audio decoder 1205 is outputted by the audio output unit 1207 to a sound reproducing apparatus connected outside.

A recording operation of the motion picture recording apparatus 1200 will be explained below. Possible processing methods for the recording operation of the motion picture recording apparatus 1200 will be explained below.

With a first processing method, the recording and reproduction control unit 1209 accumulates in the accumulation unit 1210 the coding streams separated from the demultiplexer unit 1203. In this case, the coding streams are accumulated in the accumulation unit 1210 without being decoded.

With a second processing method, the image decoder 1204 or audio decoder 1205 once decodes the coding streams separated from the demultiplexer unit 1203, the encoder 150 codes them again, and the recording and reproduction control unit 1209 accumulates the coded signal in the accumulation unit 1210.

With a third processing method, if an uncompressed image signal or audio signal is inputted from the external input unit 1211, the encoder 150 codes the signal and the recording and reproduction control unit 1209 accumulates the coded signal in the accumulation unit 1210.

Processing of the encoder 150 will be mentioned in detail later.

For reproduction processing of the data recorded in the accumulation unit 1210, the recording and reproduction control unit 1209 instructs the accumulation unit 1210 to output data to the demultiplexer 1203, and the data is reproduced by the image decoder 1204, audio decoder 1205, etc. Further, although not shown, it may be possible to output the data from the recording and reproduction control unit 1209 directly to the image decoder 1204 and audio decoder 1205. In this case, the processing in the demultiplexer 1203 can be omitted resulting in effects of reducing the amount of processing.

It may be possible to integrate the picture output unit 1206 with the audio output unit 1207 according to the present embodiment. In this case, it becomes easier for the user to make connection of apparatuses by providing a connector for outputting an image signal and a sound signal through a single cable.

The encoder 150 included in the motion picture recording apparatus 1200 according to the present embodiment will be explained below. FIG. 1 is a block diagram of the configuration of the encoder 150 according to the present embodiment.

The encoder 150 shown in FIG. 1 includes an input unit 130, a subtractor 100, a DCT unit 101, a quantization unit 102, an inverse quantization unit 104, an IDCT unit 105, an addition unit 106, a frame memory 107, a block-based motion search unit 108, a prediction picture generation unit 109, a similar-motion-area setup unit 110, a representative-motion-vector calculation unit 111, a prediction picture generation unit 112, a selection unit 113, a variable length coding unit 103, an output unit 140, a control unit 160, and a memory unit 170. The block-based motion search unit 108, the prediction picture generation unit 109, the similar-motion-area setup unit 110, the representative-motion-vector calculation unit 111, the prediction picture generation unit 112, and the selection unit 113 form a motion compensation unit 120. Each of the above-mentioned units may be configured either by the hardware or software. Further, it may be a module formed in combination with the hardware and software. The following explanations are on the premise that each unit is configured by the hardware.

The operation of the encoder shown in FIG. 1 will be explained below. The operation of each component of the encoder 150 may be an autonomous operation thereof as described below. Further, it is also possible that the control unit 160 included in the encoder 150 attains the operation of each component in cooperation with the software stored in the memory unit 170.

First of all, an image signal is inputted to the input unit 130 included in the encoder 150. Here, the inputted image signal is an uncoded image signal. For example, it is an uncompressed image or an image subjected a coded image to re-decoding. The subtractor 100 performs subtraction processing which subtracts the prediction picture block from the picture block of the inputted image. Here, the prediction picture block is outputted from the selection unit 113 which will be mentioned later. The subtractor 100 outputs a differential picture signal generated by the subtraction processing. The DCT unit 101 performs quadrature conversion of the differential picture signal outputted from the subtractor 100 for each picture block, and then outputs it to the quantization unit 102. The quantization unit 102 quantizes the inputted DCT conversion data and outputs the quantized data to the variable length coding unit 103. The variable length coding unit 103 performs variable-length coding for the quantized data. The output unit 140 outputs the variable-length coded data according to a transmission line.

On the other hand, the quantization unit 102 outputs the quantized data also to the inverse quantization unit 104. Here, the inverse quantization unit 104 performs inverse quantization for the quantized data, and outputs them to the IDCT unit 105. The IDCT unit 105 performs inverse quadrature conversion for the quantized data, restores it as a differential picture block, and outputs the resulting data to the adder 106. Here, the adder 106 adds the prediction picture block to be outputted from the selection unit 113 to the restored differential picture block to generate a reconstructed pixels block. The frame memory 107 stores the reconstructed pixels block. The reconstructed pixels block is used as a reference picture for an input picture to be subjected to next coding.

Then, when inter prediction coding of an input picture is to be performed, the frame memory 107 outputs the reconstructed pixels block to the block-based motion search unit 108 as a reference picture. By use of an input picture obtained from the input unit 130 and the reconstructed pixels block obtained from the frame memory 107, the block-based motion search unit 108 performs motion search for the input image. The motion search processing by the block-based motion search unit 108 will be mentioned in detail later. The block-based motion search unit 108 performs the motion search to obtain a motion vector (MV_block) on a block basis. Hereinafter, this is referred to as block-based motion vector. The prediction picture generation unit 109 generates a prediction picture from the block-based motion vectors obtained by the block-based motion search unit 108. The similar-motion-area setup unit 110 sets up areas having a similar motion vector, out of the block-based motion vectors obtained by the block-based motion search unit 108, as a similar motion area. The setup processing by the similar-motion-area setup unit 110 will be mentioned in detail later.

Then, the representative-motion-vector calculation unit 111 calculates a representative motion vector (MV_global) to be commonly used for a plurality of blocks included in the similar-motion-area setup unit 110. The selection processing by the representative motion vector (MV_global) of the representative-motion-vector calculation unit 111 will be mentioned in detail later. The prediction picture generation unit 112 generates a prediction picture for the similar motion area by use of the representative motion vector calculated by the representative-motion-vector calculation unit 111. The selection unit 113 selects either the prediction picture generated by the prediction picture generation unit 109 or the prediction picture generated by the prediction picture generation unit 112, and outputs the selected picture to the subtractor 100. At the same time, the selection unit 113 selects either the block-based motion vectors (MV_block) selected by the block-based motion search unit 108 or the representative motion vector (MV_global) calculated by the representative-motion-vector calculation unit 111. The selection unit 113 outputs the information on a differential motion vector, representing a difference between the selected motion vector and a prediction vector which will be mentioned later, to the variable length coding unit 103. The variable length coding unit 103 performs variable length coding of the information on the differential motion vector together with residual error data outputted from the quantization unit 102 and then outputs the resultant data.

Then, the motion search processing by the block-based motion search unit 108 will be explained below. The block-based motion search unit 108 adaptively uses two different coding modes: an intra prediction coding mode in which reconstructed pixels block in the same picture for a picture to be subjected to coding are used as a reference picture, and the motion compensation inter prediction coding mode in which preceding and following pictures are used as a reference picture on the time axis.

Operations in the case where the block-based motion search unit 108 uses the motion compensation inter prediction coding mode in the present embodiment will be explained below.

Figure 2A:
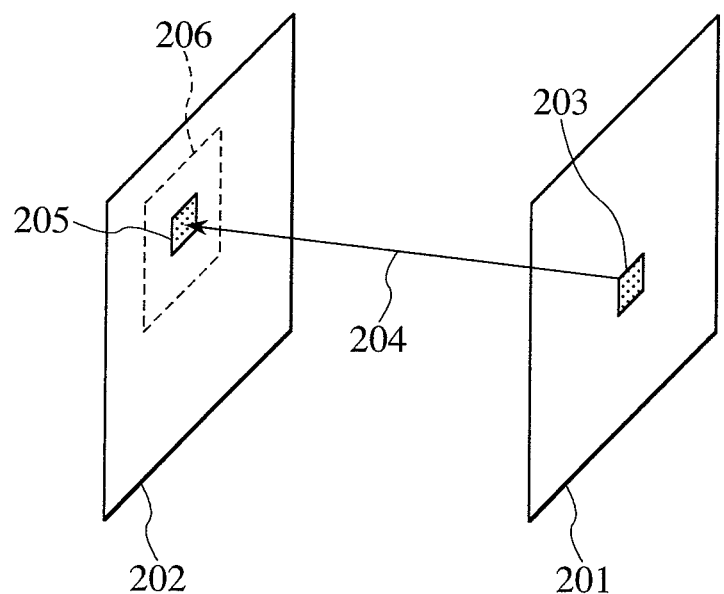
FIGS. 2A and 2B are diagrams explaining an example of a motion search operation according to the present embodiment.
Figure 2B:
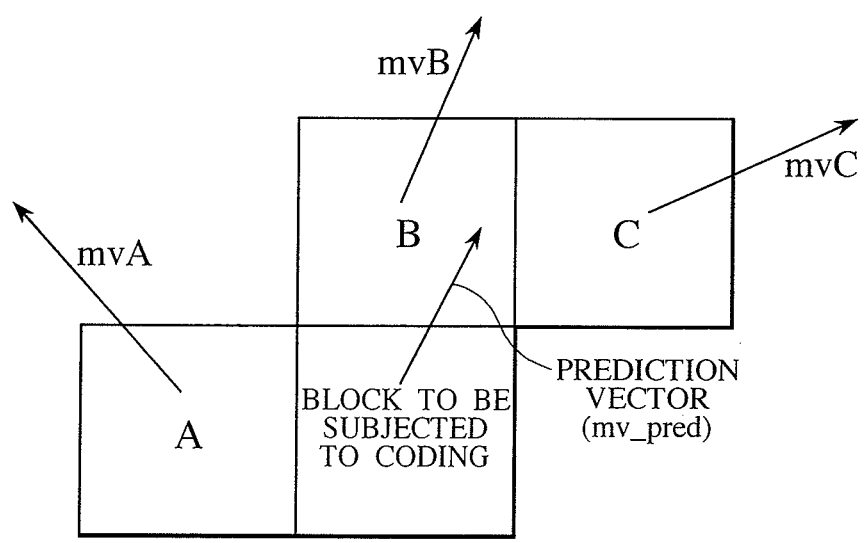

FIGS. 2A and 2B are diagrams showing an example of the motion search processing by the block-based motion search unit 108 according to the present embodiment. As shown in FIG. 2A, the block-based motion search unit 108 estimates a quantity of motion (motion vector 204) for a block to be subjected to coding 203 in a picture 201 to be subjected to coding based on a reference picture 202, generates a prediction picture 205, and calculates an prediction error between the block to be subjected to coding 203 and the prediction picture 205. Then, the block-based motion search unit 108 performs motion search in a predetermined search range 206 to calculate a motion vector having a smaller prediction error while changing the motion vector.

In this case, the motion vector has a strong correlation with motion vectors of the adjacent blocks. Based on this correlation, the block-based motion search unit 108 derives a prediction vector from motion vectors of the adjacent blocks, as shown in FIG. 2B, and uses the prediction vector for motion search processing. Further, when the calculated motion vector of each to be block subjected to coding is to be coded, it is possible to reduce the amount of information to be coded by coding only a difference between the motion and prediction vectors.

Here, a conventional method, such as H.264/AVC standard shown below, is used for the prediction vector generation processing shown in FIG. 2B. Based on the same prediction vector generation processing as the conventional method, even an existing decoder can code the generated coding streams.

First of all, as shown in FIG. 2B, the block-based motion search unit 108 determines a prediction vector (mv_pred) by use of motion vectors in adjacent blocks prior to determination of a block-based motion vector. Specifically, for example, when motion vectors in block A adjacent to the left of the block to be subjected to coding, in block B adjacent to the upside thereof, and in block C adjacent to the upper right thereof are mvA, mvB, and mvC, respectively, the prediction vector (mv_pred) is determined by equation 1.

$$\text{mv\_pred} = \text{median}(\text{mv}A, \text{mv}B, \text{mv}C) \qquad \text{(Equation 1)}$$

Then, the block-based motion search unit 108 performs motion search as shown in FIG. 2A based on the prediction vector (mv_pred). For example, the block-based motion search unit 108 selects, as a motion vector (MV_block) of the block to be subjected to coding, a motion vector that is allowed to minimize a cost value ($J_{MOTION}$) calculated with the cost function as shown in equation 2.

$$J_{MOTION} = D_{DFD} + \lambda_{MOTION} \cdot R_{MOTION} \qquad \text{(Equation 2)}$$

where $D_{DFD}$ denotes the sum of absolute difference (SAD) of a picture to be subjected to coding and a prediction picture or the sum of square difference (SSD) thereof, and $R_{MOTION}$ denotes the amount of codes of the motion vector information. Further, $\lambda_{MOTION}$ denotes a weighting coefficient for above-mentioned $R_{MOTION}$, which is, for example, a value calculated by the following equation 3 using the quantization parameter (QP) as a variable.

$$\lambda_{MOTION} = \sqrt{\{0.85 \times 2^{(QP-12)/3}\}} \qquad \text{(Equation 3)}$$

Equation 3 above is prescribed, for example, by reference software provided by a standardization committee called JM (Joint Model) as a technique of selecting an optimal motion vector out of reference pictures in the motion compensation inter prediction coding technique. For details on the motion vector selection processing by the cost function, for example, it is recommended to use the technique disclosed, for example, in "Rate-Distortion Optimization for Video Compression", IEEE Signal Processing Magazine, Vol. 15, No. 6, pp. 74-90 (November, 1998).

The motion vector selection processing by the cost function based on the equations 2 and 3 is merely an example, and therefore, it is also possible to use other methods without using the above-mentioned method.

The block-based motion search unit 108 can calculate, through the motion search as mentioned above, a motion vector which improves the efficiency of picture compression by coding.

Figure 3:
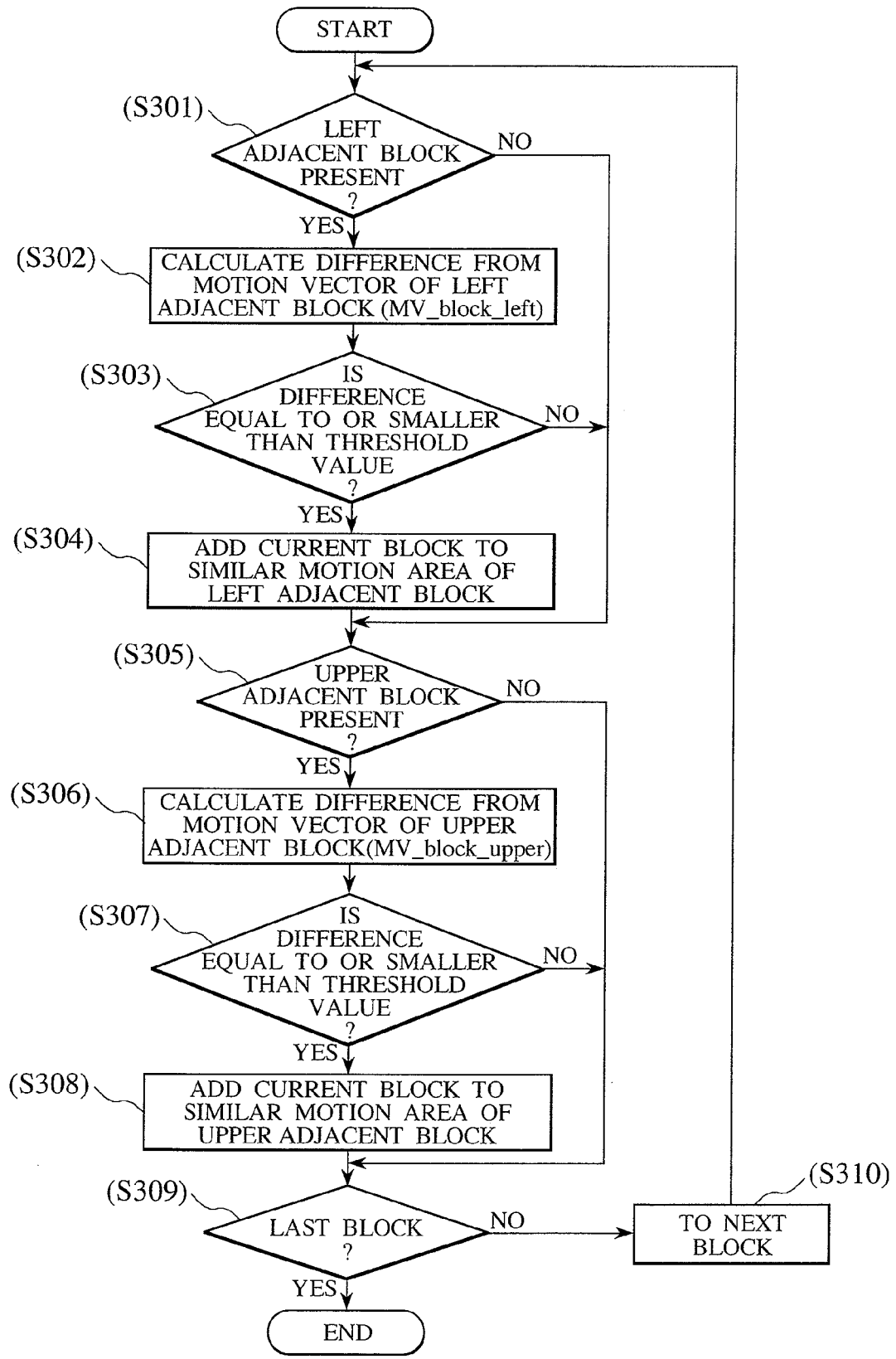
FIG. 3 is a diagram showing an example of a processing flow chart of a motion compensation unit according to the present embodiment.

An example of the setup processing by the similar-motion-area setup unit 110 will be explained in detail below with reference to the flow chart of FIG. 3.

First of all, the similar-motion-area setup unit 110 determines whether or not a left adjacent block exists (S301) when viewed from the current block. If there is no left adjacent block (when the result of the determination in S301 is "NO"), processing proceeds to Step 305 (S305) which will be mentioned later. If there is a left adjacent block (when the result of the determination in S301 is "YES"), the similar-motion-area setup unit 110 calculates a difference (MV_diff) between the block-based motion vector of the left adjacent block (MV_block_left) and the block-based motion vector of the current block (MV_block_curr) (S302). To calculate a difference value, for example, it is possible to decompose each of the above-mentioned block-based motion vectors into x and y components as shown in the following equations 4 and 5, and obtain absolute values of the sum of respective components as shown in equation 6. Alternatively, it may be possible to use the square sum instead of the absolute sum.

$$MV\_block\_left=(MVleft\_x, MVleft\_y) \quad \text{(Equation 4)}$$

$$MV\_block\_curr=(MVcurr\_x, MVcurr\_y) \quad \text{(Equation 5)}$$

$$MV\_diff=|MVcurr\_x, MVleft\_x|+|MVcurr\_y, MVleft\_y| \quad \text{(Equation 6)}$$

Here, the similar-motion-area setup unit 110 compares the vector difference value (MV_diff) calculated by the equation 6 with a predetermined threshold value (S303). If the difference value is equal to or smaller than the threshold value (when the result of the determination in S303 is "YES"), the similar-motion-area setup unit 110 determines that the current block is a similar motion area of the left adjacent block (S304).

In contrast, if the difference value is larger than the threshold value (when the result of the determination in S303 is "NO"), processing proceeds to Step 305 (S305). In Step 305 (S305), the similar-motion-area setup unit 110 determines whether or not an upper adjacent block exists when viewed from the current block. If there is no upper adjacent block (when the result of the determination in S305 is "NO"), processing proceeds to Step 309 (S309). If an upper adjacent block exists (when the result of the determination in S305 is "YES"), the similar-motion-area setup unit 110 calculate a difference (MV_diff) between the block-based motion vector of the upper adjacent block (MV_block_upper) and the block-based motion vector of the current block (MV_block_curr) (S306). The difference value can be calculated when (MV_block_left) is replaced with (MV_block_upper) in above-mentioned equations 4 to 6. Here, the similar-motion-area setup unit 110 compares the calculated difference value (MV_diff) with a predetermined threshold value (S307). If the difference value is equal to or smaller than the threshold value (when the result of the determination in S307 is "YES"), the similar-motion-area setup unit 110 determines that the current block is a similar motion area of the upper adjacent block (S308). In contrast, if the difference value is larger than the threshold value (when the result of the determination in S307 is "NO"), processing proceeds to Step 309 (S309).

Then, the similar-motion-area setup unit 110 determines whether or not the current block is the last block in the picture (S309). If the current block is not the last block in the picture (when the result of the determination in S309 is "NO"), the similar-motion-area setup unit 110 shifts its processing to the next block (S310) and performs processing again from Step 301.

In contrast, if the current block is the last block in the picture (when the result of the determination in S309 is "YES"), the similar-motion-area setup unit 110 terminates processing.

Performing the setup processing of the similar motion area as mentioned above makes possible to set up a plurality of blocks having a similar motion vector as a similar motion area.

Figure 4:
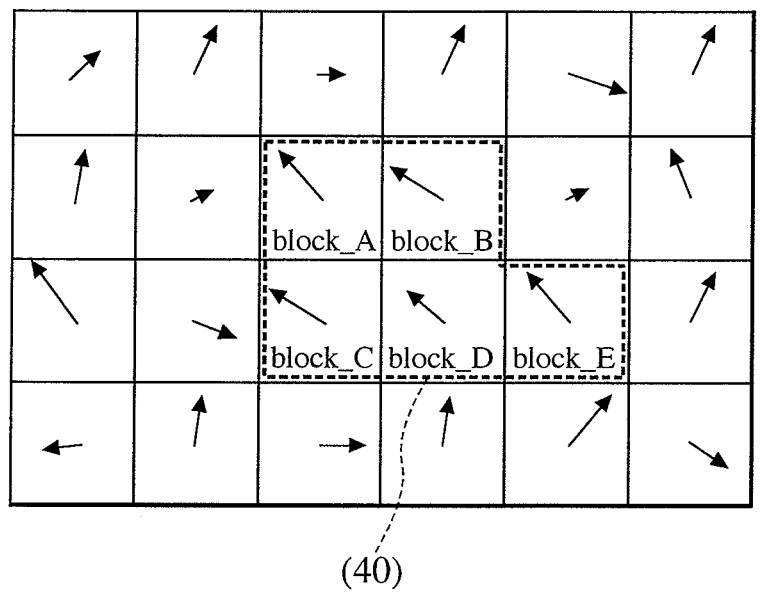
FIG. 4 is a diagram showing an example of a motion search result according to the present embodiment.
Figure 5:
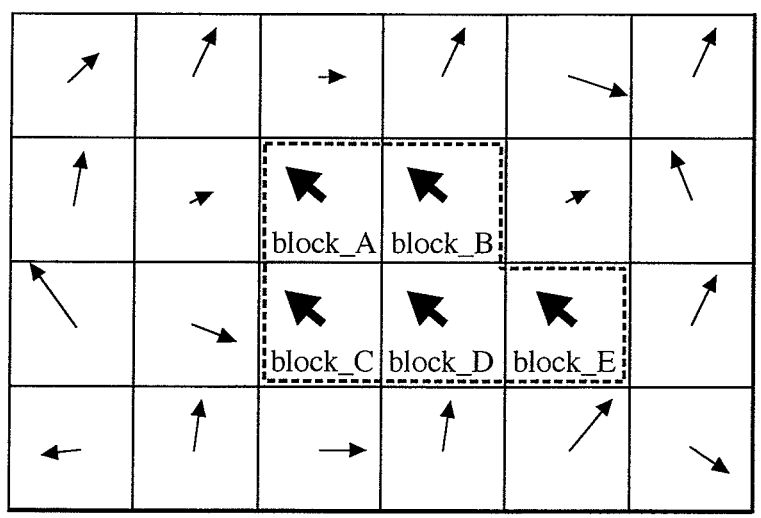
FIG. 5 is a diagram showing an example of a setup result of a representative motion vector according to the present embodiment.

Referring to FIGS. 4 and 5, an example on how to execute processing on selection of the representative motion vector (MV_global) for the similar motion area by the representative-motion-vector calculation unit 111 will be explained in detail.

FIG. 4 shows a block-based motion vector when block-based motion search for each block of one picture is performed. FIG. 4 shows that an area 40 surrounded by dotted lines is an area selected by the similar-motion-area setup unit 110 as a similar motion area. In FIG. 4, five blocks block_A to block_E are selected as a similar motion area.

When block-based motion vectors of these five blocks are MVblockA to MVblockE, respectively, the representative-motion-vector calculation unit 111 calculates an average for each of the x and y components of motion vectors of blocks and regards the resultant vector as a representative motion vector. When an average is used, a representative motion vector can be defined by a simpler method. Further, it may be possible to regard a median for each of the x and y components instead of an average thereof, as a representative motion vector. When a median is used, it becomes possible to take a statistical distribution into consideration in relation to a similar motion area.

In either case, it is only necessary to regard an output vector derived by a function, having motion vectors provided by a plurality of blocks included in the similar motion area as variables, as a representative motion vector of the similar motion area. Thus, it becomes possible to regard a vector similar to each of motion vectors of a plurality of blocks included in the similar motion area as a representative motion vector.

Further, an alternative method of calculating a representative motion vector may be used. More specifically, the representative-motion-vector calculation unit 111 may calculate a similar motion area cost (sum total of costs of blocks) when the block-based motion vector for any one block in the similar motion area is considered as a representative motion vector of the similar motion area, and calculate any one block-based motion vector as a representative motion vector through calculation and comparison of the cost for the block-based motion vector of each block.

In the example of FIG. 4, it is only necessary for the representative-motion-vector calculation unit 111 to calculate respective cost value when MVblockA to MVblockE are applied to block_A to block_E, respectively, and regard a motion vector associated with a minimum cost value as a representative motion vector. Thus, a motion vector associated with a minimum cost value is selected from existing motion vectors, so that a representative motion vector for which the amount of generated codes (amount of data after picture coding) is suppressed may be calculated in a comparatively simple manner.

FIG. 5 shows a state where the representative-motion-vector calculation unit 111 has set the representative motion vector calculated through any of the above-mentioned processing as a motion vector (block_A to block_E) for each block in the similar motion area 40. Although FIGS. 4 and 5 show an example of an operation in the case where only one similar motion area exists in the picture, it is only necessary to perform similar processing for each similar motion area to calculate a representative motion vector even if a plurality of similar motion areas exist in the picture.

Performing the above-mentioned representative motion vector calculation processing makes possible to set up a representative motion vector for the similar motion area.

Figure 6:
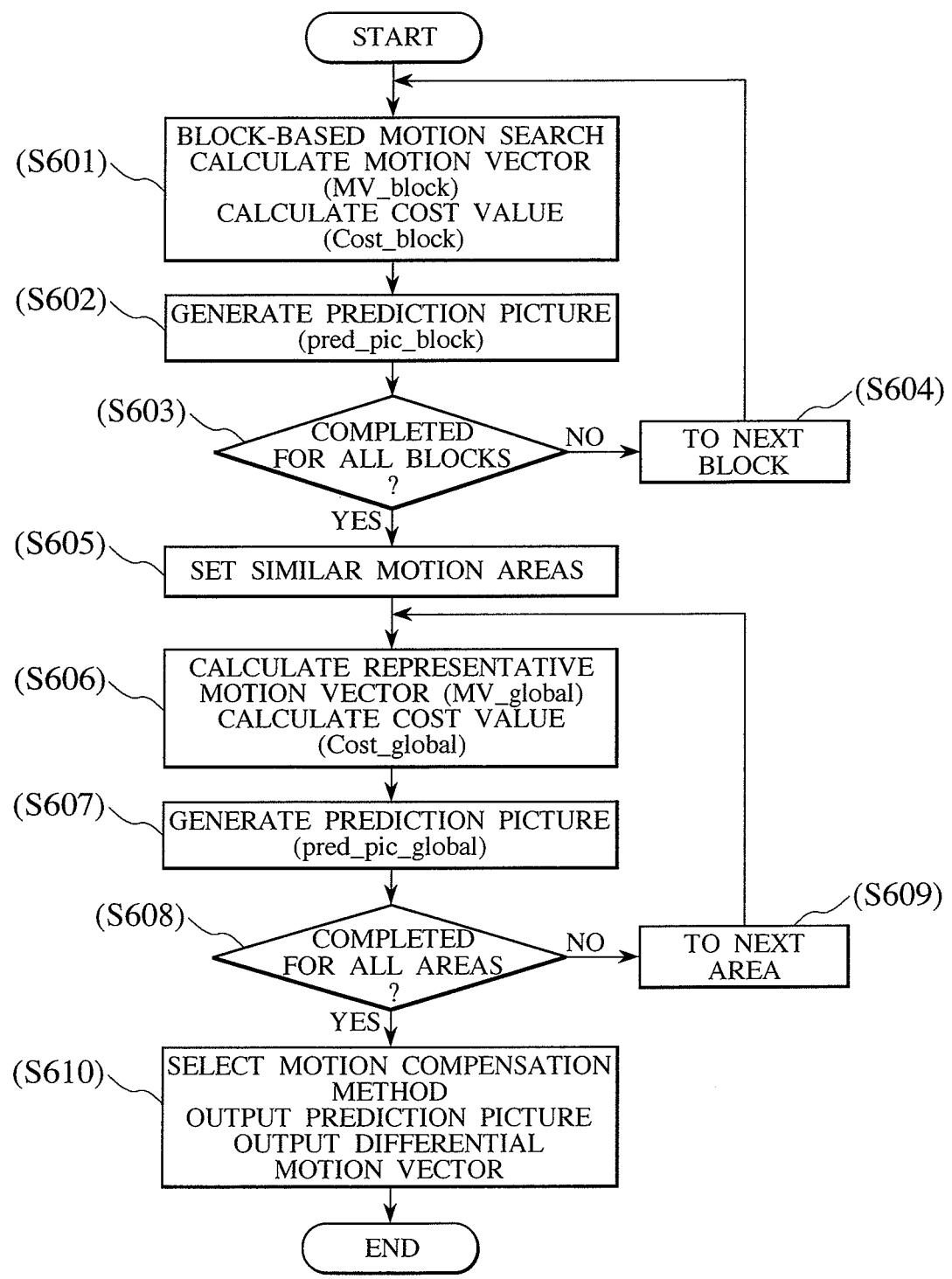
FIG. 6 is a diagram showing an example of a processing flow chart of the motion compensation unit according to the present embodiment.

FIG. 6 shows an example flow chart of the processing by the motion compensation unit 120 included in the encoder 150 shown in FIG. 1.

First of all, the block-based motion search unit 108 performs block-based motion search for an input picture. Here, the motion compensation unit 120 calculates a block-based motion vector (MV_block) associated with a minimum cost value (S601). Also, it calculates the cost value in this case as a block-based cost value (Cost_block). Then, the prediction picture generation unit 109 generates a prediction picture (pred_pic_block) from the block-based motion vector determined by the block-based motion search unit 108 (S602). Here, the prediction picture generation unit 109 determines whether or not processing of Steps 601 and 602 is completed for all blocks in the picture (S603) and, if processing is not completed for any block, processing proceeds to the next block (S604) and then the processing of Steps 601 and 602 is performed again. Processing for determination in Step 603 is performed by, for example, the block-based motion search unit 108 or the control unit 160.

Then, if processing is completed for all blocks in the picture in Step 603, processing proceeds to the similar-motion-area setup processing (S605) by the similar-motion-area setup unit 110. Detailed processing of Step 605 is as shown in the flow chart of FIG. 3. Then, the representative-motion-vector calculation unit 111 calculates a representative motion vector (MV_global) for the similar motion area set up in Step 605 (S606). Further, the representative-motion-vector calculation unit 111 calculates the cost value (Cost_global) when motion prediction is performed using the calculated representative motion vector (S606). Detailed processing of Step 606 has been described with reference to FIGS. 4 and 5. Then, the prediction picture generation unit 112 generates a prediction picture (pred_pic_global) based on the representative motion vector calculated in Step 606 (S607).

Here, the prediction picture generation unit 112 determines whether or not processing of Steps 606 and 607 is completed for all similar motion areas in the picture (S608) and, if processing is not completed for any similar motion area, processing proceeds to the next similar motion area (S609) and then the processing of Steps 606 and 607 is performed again.

In Step 610, for each similar motion area or each block, the selection unit 113 determines which of a method of motion compensation processing (motion search processing and prediction picture generation processing) for each block in Steps 601 to 604 and a method of motion compensation processing (motion search processing and prediction picture generation processing) for each similar motion area in Steps 606 to 609 is to be used (S610). Further, in Step 610, the selection unit 113 outputs a prediction picture calculated with the selected motion compensation method to the subtractor 100, and outputs the information on a motion vector calculated with the selected motion compensation method to the variable length coding unit 103 (S610). Step 610 will be mentioned in detail later.

When the selection unit 113 completes the above-mentioned processing of Step 610, the processing of the motion compensation unit 120 also ends.

Then, Step 610 of FIG. 6 will be explained in detail below with reference to FIG. 7. Here, FIG. 7 shows an example in the case where the selection of motion compensation method in Step 610 is made for each similar motion area.

Figure 7:
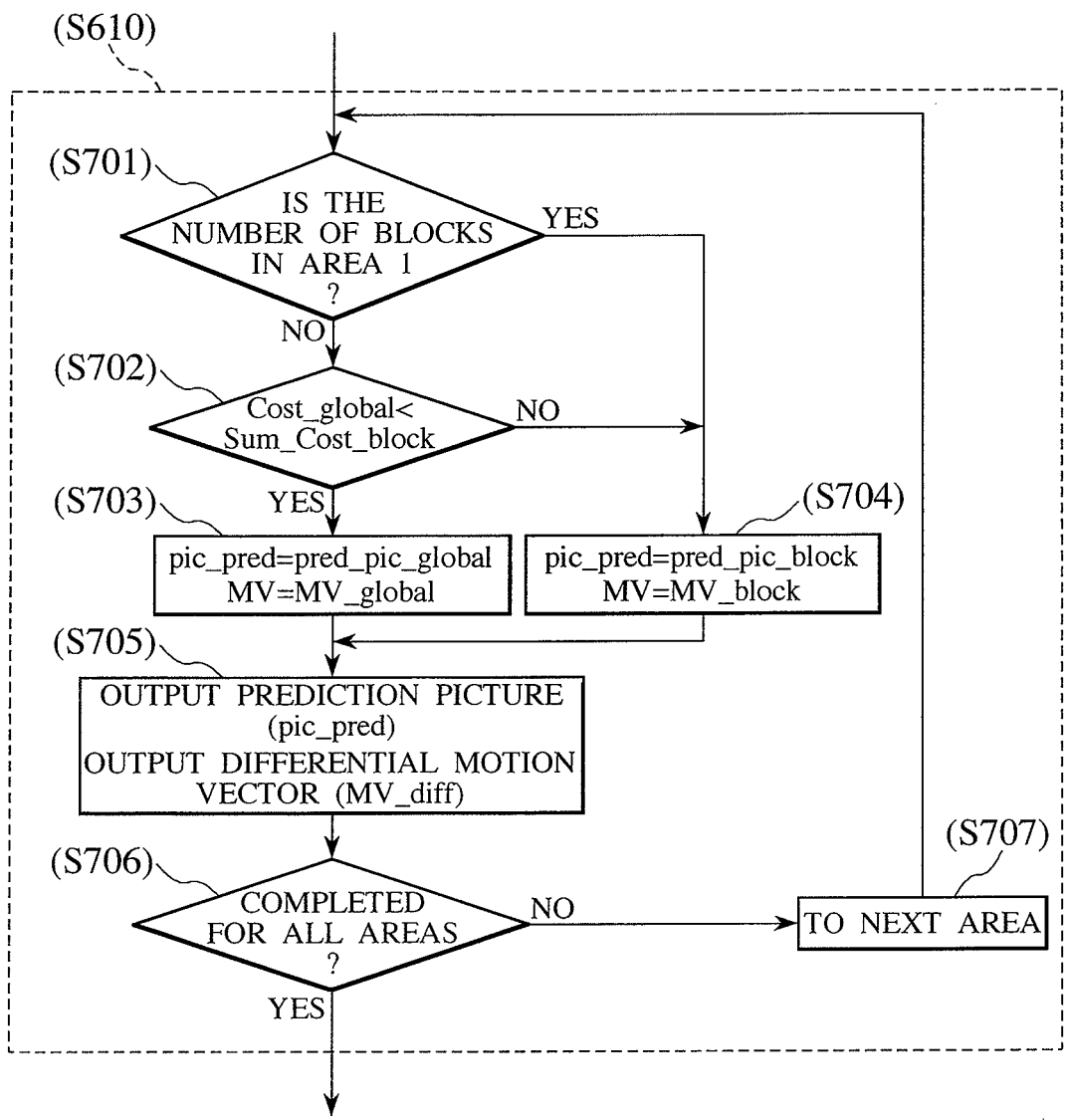
FIG. 7 is a diagram showing an example of a processing flow chart of a selection unit according to the present embodiment.

Each step shown in FIG. 7 is performed by the selection unit 113. In Step 701, the selection unit 113 first determines whether or not the number of blocks to form any one similar motion area in the picture is one (S701). If the number of blocks to form the similar motion area is one (when the result of the determination in S701 is "YES"), processing proceeds to Step 704. The selection unit 113 sets a prediction picture (pred_pic_block) of each block included in a similar motion area generated by the prediction picture generation unit 109 as an output prediction picture (pred_pic) of each block included in the similar motion area, and sets a block-based motion vector (MV_block) of each block included in the similar motion area as an output motion vector (MV) of each block (S704).

By contrast, if the number of blocks forming the similar motion area in Step 701 is not one (when the result of the determination in S701 is "NO"), processing proceeds to Step 702. The selection unit 113 compares the sum total (Sum_Cost_block) of the block-based cost values (Cost_block) calculated using the block-based motion vectors (S601) for the blocks included in the similar motion area with the cost value (Cost_global) of the similar motion area calculated (S606) using the representative motion vector (S702). Here, if the cost value (Cost_global) of the similar motion area is smaller than the sum total (Sum_Cost_block) of the block-based cost values (when the result of the determination in S702 is "YES"), processing proceeds to Step 703. In this case, the selection unit 113 sets the prediction picture (pred_pic_global) of each block included in the similar motion area generated by the prediction picture generation unit 112 as an output prediction picture (pred_pic) of each block included in the similar motion area, and sets the representative motion vector (MV_global) as an output motion vector (MV) common to each block included in the similar motion area (S703). Conversely, if the cost value (Cost_global) of the similar motion area is larger than the sum total (Sum_Cost_block) of the block-based cost values (when the result of the determination in S702 is "NO"), processing proceeds to Step 704. Detailed processing of Step 704 is as mentioned above.

In Step 705, the selection unit 113 outputs the output prediction picture set up in Step 703 or 704 to the subtractor 100 (S705). Further, the selection unit 113 outputs, to the variable length coding unit 103, the differential motion vector (MV_diff) representing a difference between the motion vector of each block set up in Step 703 or 704 and the prediction vector (MV_pred) shown in the explanation of FIG. 2 (S705).

Then, the selection unit 113 determines whether or not processing is completed for all similar motion areas in the picture (S706). If processing is not completed for any similar motion area, processing proceeds to the next similar motion area (S707) and the selection unit 113 performs the processing of Steps 701 to 705 again. If processing is completed for all similar motion areas in the picture in Step 706, the selection unit 113 terminates processing.

Referring to the flow chart of FIG. 7, for a similar motion area when the selection unit 113 selects Step 703, all the motion vectors included in the similar motion area become a common representative motion vector (MV_global). In this case, because of the nature of the prediction vector calculation method shown by the equation 1, in an area of blocks having the same motion vector, the closer the position of a block is to the bottom right, the closer becomes the prediction vector provided by the block to the same motion vector. Further, the prediction vector converges to the same motion vector depending on the area size.

Therefore, among the blocks included in the similar motion area according to the present embodiment, the closer the position of a block is to the bottom right, the closer becomes the prediction vector (MV_pred) to the representative motion vector (MV_global).

Thus, it is possible to reduce the differential motion vector (MV_diff), representing a difference between the output motion vector (MV) and the prediction vector of each block. That is, in any one similar motion area, when a representative motion vector is outputted for the one block, the motion vector of the one block is referenced for other blocks included in the similar motion area. In this case, it is only necessary to output a 0 differential vector. This leads to remarkable reduction of the amount of data of the motion vector to be transmitted, thereby making it possible to reduce the amount of generated codes regarding the motion vector outputted from the variable length coding unit 103. Further, the motion compensation method is selected based on the result of cost comparison in Step 702. Therefore, also for the sum total of generated codes in relation to residual error data, representing a difference between the input and prediction pictures, outputted from the quantization unit 102, and the amount of generated codes in relation to motion vectors, out of the amount of generated codes outputted from the variable length coding unit 103, it becomes possible to select and output a lower amount of generated codes.

A specific example of an operation of the motion picture recording apparatus 1200 according to the present embodiment will be explained below with reference to FIG. 13.

Figure 13:
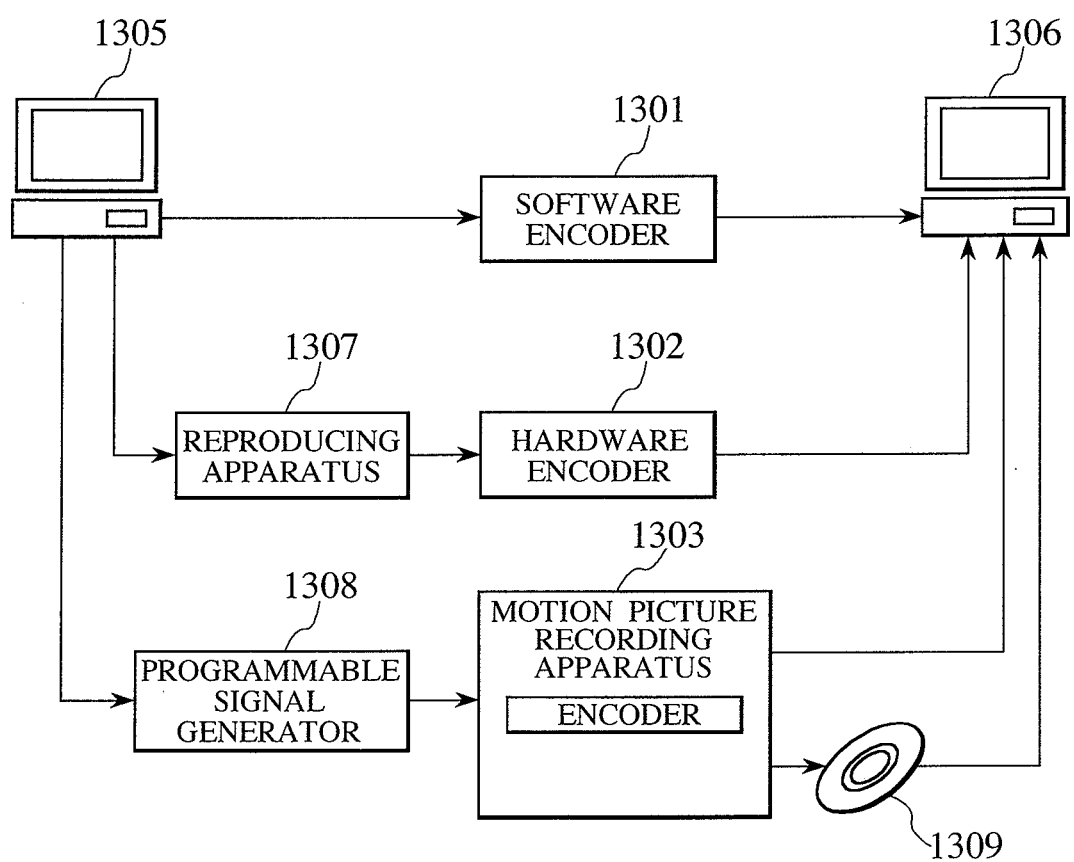
FIG. 13 is a diagram showing an example of a method of confirming picture coding processing according to the present embodiment.

An information processing apparatus 1305 of FIG. 13 generates picture signal data (for example, composed of a binary file), and a programmable signal generator 1308 converts the data to a signal suitable for the motion picture recording apparatus 1303. This signal is inputted to the motion picture recording apparatus 1303, and the motion picture recording apparatus 1303 performs picture coding processing. Then, the coding stream outputted from the motion picture recording apparatus 1303 is inputted to the information processing apparatus 1306. Alternatively, with the motion picture recording apparatus 1303, coding streams recorded on a removable medium 1309 are read by the information processing apparatus 1306. In this case, the information processing apparatus 1306 can analyze motion vector data and amount of data in the read coding streams.

A specific example of an input picture will be explained here. This input image is an image of contours of two objects in a scene where the contours of the objects are overlapped while they are falling at different speeds. An example of an input picture and an output result will be explained below.

Figure 14:
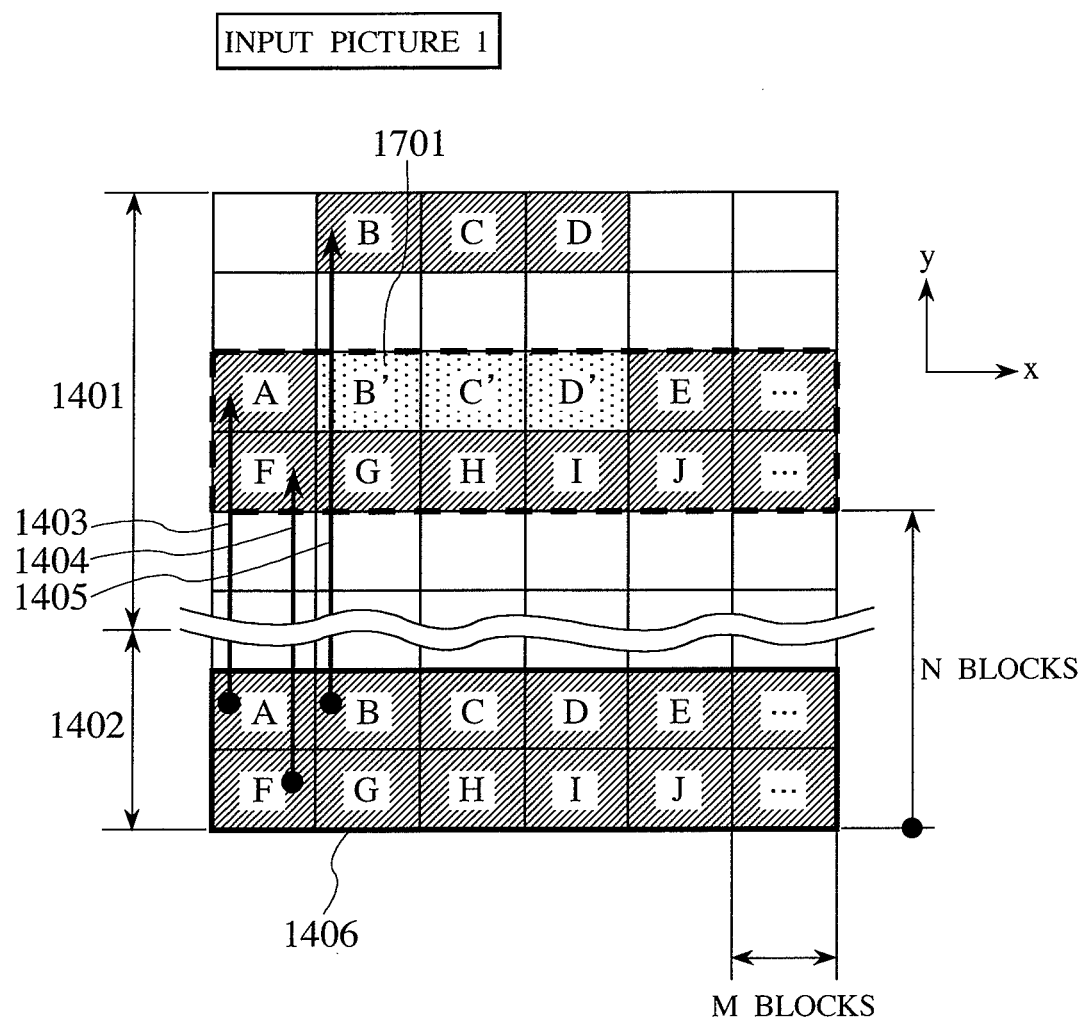
FIG. 14 is a diagram showing an example of an input picture according to the present embodiment.

First of all, picture signal data generated by the information processing apparatus 1305 will be explained below with reference to FIG. 14 (hereafter, the picture signal data of FIG. 14 is referred to as input picture 1). FIG. 14 shows pictures of two frames (or fields) contained in the input picture 1 with the pictures superimposed. A portion 1401 above the wavy line denotes a preceding frame and a portion 1402 below the wavy line a current frame. Hereafter, explanation is made on the premise that the rightward direction is the x direction and the upward direction is the y direction.

Each square shown in the diagram denotes a picture block, and reference symbols A to J marked in the picture blocks denote that each block contains an inherent picture. For example, each block is composed of a luminance signal and a chromaticity signal. Further, M picture blocks having an inherent picture are stored also to the right of picture blocks E and J in the current frame 1402. Picture blocks corresponding to the above-mentioned picture blocks are stored also to the right of picture blocks E and J in the preceding frame 1401. Hereafter, the picture blocks A to J and the blocks to the right thereof are collectively referred to as a block group 1406.

Here, although the block size in FIG. 14 is explained, for example, as 4×4, it may be 16×16 or 8×8. The block size shall be set according to the syntax of the coding processing.

Here, a picture block B' has a very small amount of differential data of a differential picture with respect to a picture block B. Likewise, a picture block C' has a very small amount of differential data of a differential picture with respect to a picture block C, and a picture block D' has a very small amount of differential data of a differential picture with respect to a picture block D. Here, blocks without a reference symbol (A to J) are in a state of zero luminance signal and zero chromaticity signal.

Further, in the input picture 1, picture blocks F to J of both the current and preceding frames are arranged in a row, and the picture blocks F to J of both frames are separated from each other by a distance of N blocks.

Therefore, in the preceding frame, each of picture blocks A to J other than picture blocks B, C, and D exists at a position separated from the counterpart in the current frame by a y-directional distance of N blocks. In the preceding frame, unlike other blocks, each of picture blocks B, C, and D exists at a position separated from the counterpart in the current frame by a y-directional distance of N+2 blocks. Further, in the preceding frame, each of picture blocks B', C', and D' exists at a position separated from picture blocks B, C, and D, respectively, by a y-directional distance of N blocks.

Here, when conventional motion search is performed for the current frame of the input picture 1 with the pictures in the preceding frame regarded as a reference picture, motion vectors as shown by arrows 1403 to 1405 are calculated. Specifically, in conventional motion vector search, a prediction picture block is determined so as to minimize the picture block difference value and, therefore, if the preceding frame contains the same picture block as the one in the current frame, that picture block in the preceding frame is selected as a prediction picture.

Therefore, referring to FIG. 14, a motion vector 1403 starting from a picture block A in the current frame and ending at a picture block A in the preceding frame has a y-directional size of N blocks. Likewise, a motion vector 1404 starting from a picture block F in the current frame and ending at a picture block F in the preceding frame has a y-directional size of N blocks. Although not shown, also for each of picture blocks E, G, H, I, and J in the current frame, a vector having a y-directional size of N blocks is calculated. Likewise, also for each of blocks to the right of picture blocks E and J in the current frame, a vector having a y-directional size of N blocks is calculated.

For the picture block B, however, the motion vector 1405 starting from a picture block B in the current frame and ending at a block B in the preceding frame, having a y-directional size of N+2 blocks, is calculated. Likewise, although not shown, for a picture block C, a motion vector starting from a picture block C in the current frame and ending at a picture block C in the preceding frame, having a y-directional size of N+2 blocks, is calculated. Likewise, for a picture block D, a motion vector starting from a picture block D in the current frame and ending at a picture block D in the preceding frame, having a y-directional size of N+2 blocks, is calculated.

That is, the current frame of the input picture 1 of FIG. 14 includes a rectangular block group 1406 which is composed of a first block group (blocks B, C, and D) including a plurality of blocks having a first motion vector and a second block group (blocks A, D, E, G, H, I, J, etc.) including a plurality of blocks having a second motion vector.

Further, the preceding frame of the input picture 1 of FIG. 14 includes the same picture as that of each block in the second block group, at a position separated from the counterpart in the second block group in the current frame by a distance of the second motion vector, and includes the same picture as that of each block in the first block group, at a position separated from the counterpart in the first block group in the current frame by a distance of the first motion vector.

Further, the preceding frame of the input picture 1 of FIG. 14 includes pictures (blocks B', C', and D'), each having a small difference from the counterpart in the first block group in the current frame, at a position separated from the counterpart in the first block group in the current frame by a distance of the second motion vector.

Motion vector data, prediction vector (mv_pred) data, differential motion vector data, and differential picture data provided by coding streams outputted when the conventional coding processing is performed for the above-mentioned input picture 1 will be explained below with reference to FIG. 8.

Figure 8:
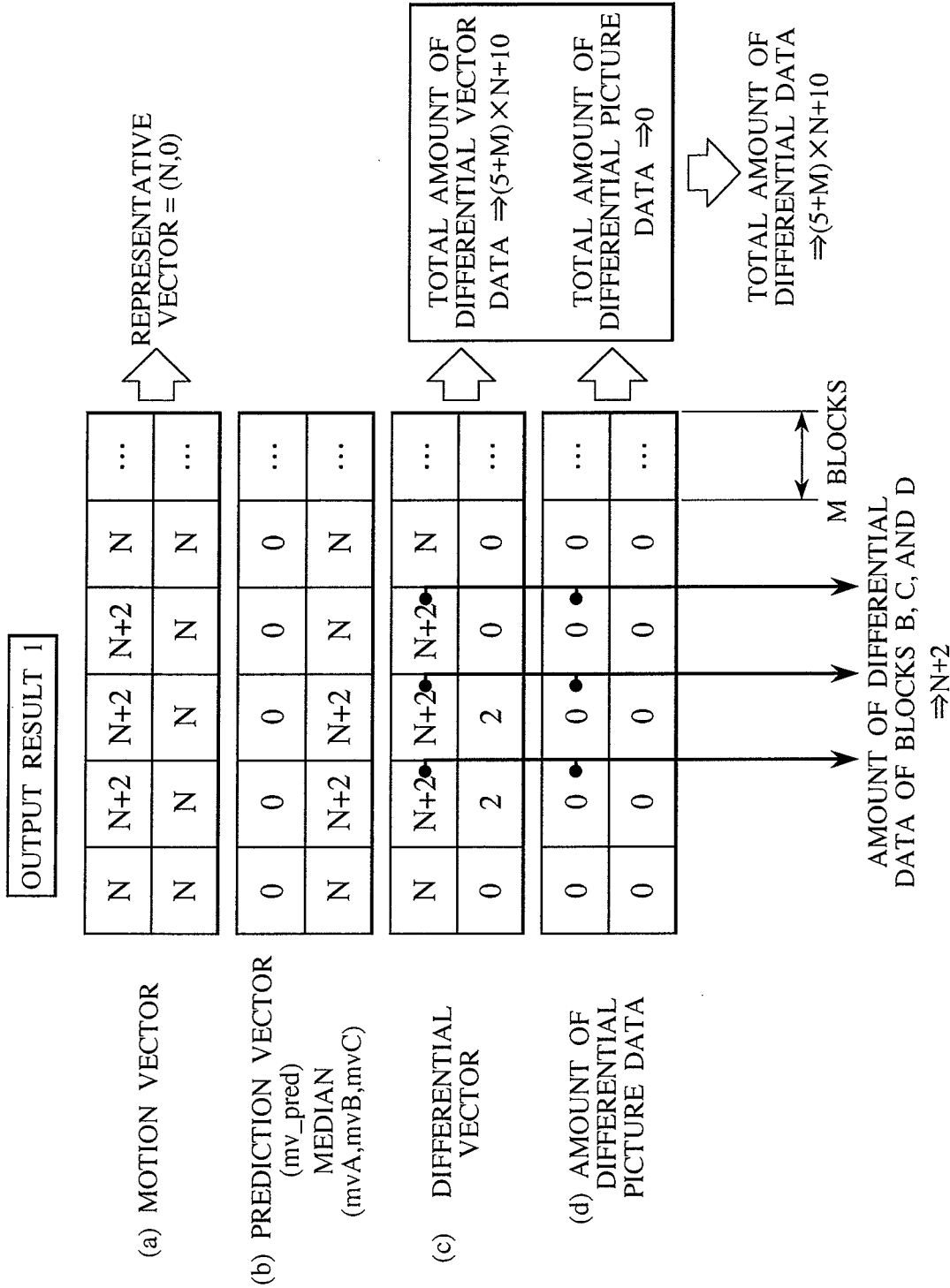
FIG. 8 is a diagram showing an example of an output result according to a conventional motion picture recording apparatus.

FIG. 8 shows (a) motion vector data, (b) prediction vector (mv_pred) data, (c) differential motion vector data, and (d) differential picture data when the conventional coding processing is performed for the block group 1406 in the current frame of the input picture 1 (hereafter the pieces of data of FIG. 8 are collectively referred to as "output result 1").

Here, a notation used for vector values in FIG. 8 will be explained below. With the input picture 1, the direction of each motion vector obtained by search is only the y direction. Therefore, only the y value of a motion vector (x,y) is described for each of (a) motion vector data, (b) prediction vector (mv_pred) data, and (c) differential motion vector data. Here, (b) prediction vector (mv_pred) data is calculated using above-mentioned equation 1. Further, (c) differential vector data is obtained by subtracting (b) prediction vector (mv_pred) data from (a) motion vector data, and included in outputted encoded data. Further, (d) differential picture data denotes a difference between a picture block to be subjected to coding (a block in the current frame) and a prediction picture (a block in the preceding frame pointed by a motion vector). In FIG. 8, the amount of differential picture data equivalent to the amount of one block data of a motion vector is noted as one.

With the output result of the conventional coding processing (output result 1) shown in FIG. 8, the total amount (sum of absolute values) of (c) differential motion vector data is (5+M)N+10, and the total amount (sum of absolute values) of (d) differential picture data is zero. Therefore, the total amount of differential data generated by the coding processing is (5+M)N+10.

Figure 9:
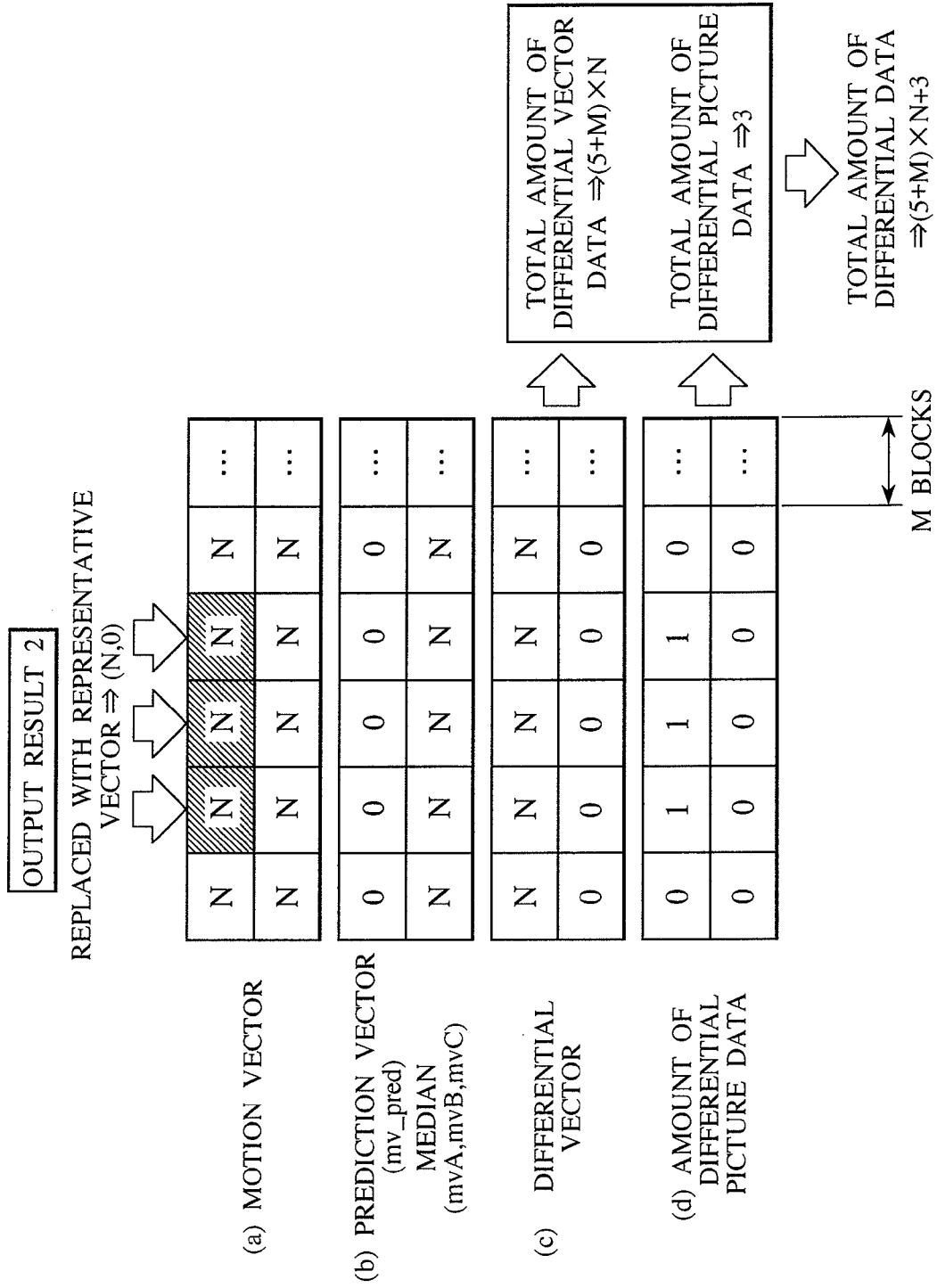
FIG. 9 is a diagram showing an example of an output result according to the present embodiment.

In contrast, the results of (a) to (d) obtained when the coding processing according to the present embodiment is performed for the input picture 1 are as shown in FIG. 9 (hereafter the data of FIG. 8 are collectively referred to as "output result 2").

First, a similar motion area will be calculated in the present embodiment. Although a threshold value used for the calculation of a similar motion area depends on a mode for each apparatus, it is necessary that the block group 1406 in the current frame be determined to be one similar motion block in the case of the present picture signal data.

Therefore, it is necessary to set up a motion vector of picture blocks B to D of the input picture 1 so as to minimize the differences from a motion vector N provided by other picture blocks of the block group 1406. In the example of FIG. 8, although the size of the motion vector of picture blocks B to D is N+2, it may be N+1.

Thus, the motion vector of picture blocks B to D is made different from that of other picture blocks and the difference therebetween is minimized, so that it is possible to regard the block group 1406 in the current frame as a similar motion area in the coding processing of the present embodiment.

Further, in the coding processing of the present embodiment, a representative motion vector is calculated from conventional (a) motion vector data of FIG. 8. Here, as mentioned with reference to FIGS. 4 and 5, a representative motion vector is calculated from a median, average, etc. of each motion vector in the same similar motion area. Here, in the case of (a) in FIG. 8, when M=2, there are three motion vectors having a size of N+2 and 11 motion vectors having a size of N in the same similar motion area. In this case, the median becomes N, and the average N+0.4 or N when rounded off. Further, it is possible to approximate the average to N by increasing the value of M even without performing rounding off.

In the above-mentioned case, if a representative motion vector is calculated using the motion vector data of (a) in FIG. 8 through the representative motion vector calculation method according to the present embodiment, a motion vector having a y-directional size of N is calculated as a representative motion vector.

Here, in the coding processing according to the present embodiment, all motion vectors in the same similar motion area are replaced with a representative motion vector, as shown in (a) of FIG. 9. Specifically, the size N+2 of the motion vector of picture blocks B, C, and D in the current frame of (a) in FIG. 8 is replaced with N in (a) of FIG. 9. As a result, in the output result 2, the size of (a) motion vector data in the block group 1406 (having the same similar motion vectors) becomes N, and (b) prediction vector (mv_pred) data, (c) differential motion vector data, and (d) differential picture data are as shown in FIG. 9.

As a result, in the output result (output result 2) of the coding processing according to the present embodiment shown in FIG. 9, the total amount (sum of absolute values) of (c) differential motion vector data becomes (5+M)N, and the total amount (sum of absolute values) of (d) differential picture data becomes 3. Therefore, the total amount of differential data generated by the coding processing is (5+M)N+3 which is smaller than the total amount of differential data according to the conventional coding processing, (5+M)N+10.

The preceding frame and current frame of the picture signal data of FIG. 14 (an example has been explained above) are generated by the information processing apparatus 1305 of FIG. 13 and then inputted to the motion picture recording apparatus 1303. Coding streams outputted from the motion picture recording apparatus 1303 of the present embodiment are analyzed by the information processing apparatus 1306. In comparison with the output result 1 of FIG. 8, i.e., the result obtained by the conventional motion picture recording apparatus, the output result 2 of the embodiment shown in FIG. 9 yield less amount of data.

Further, an example of operation when still another signal is inputted to the motion picture recording apparatus 1303 when the results of FIG. 9 are obtained will be explained below.

Figure 10:
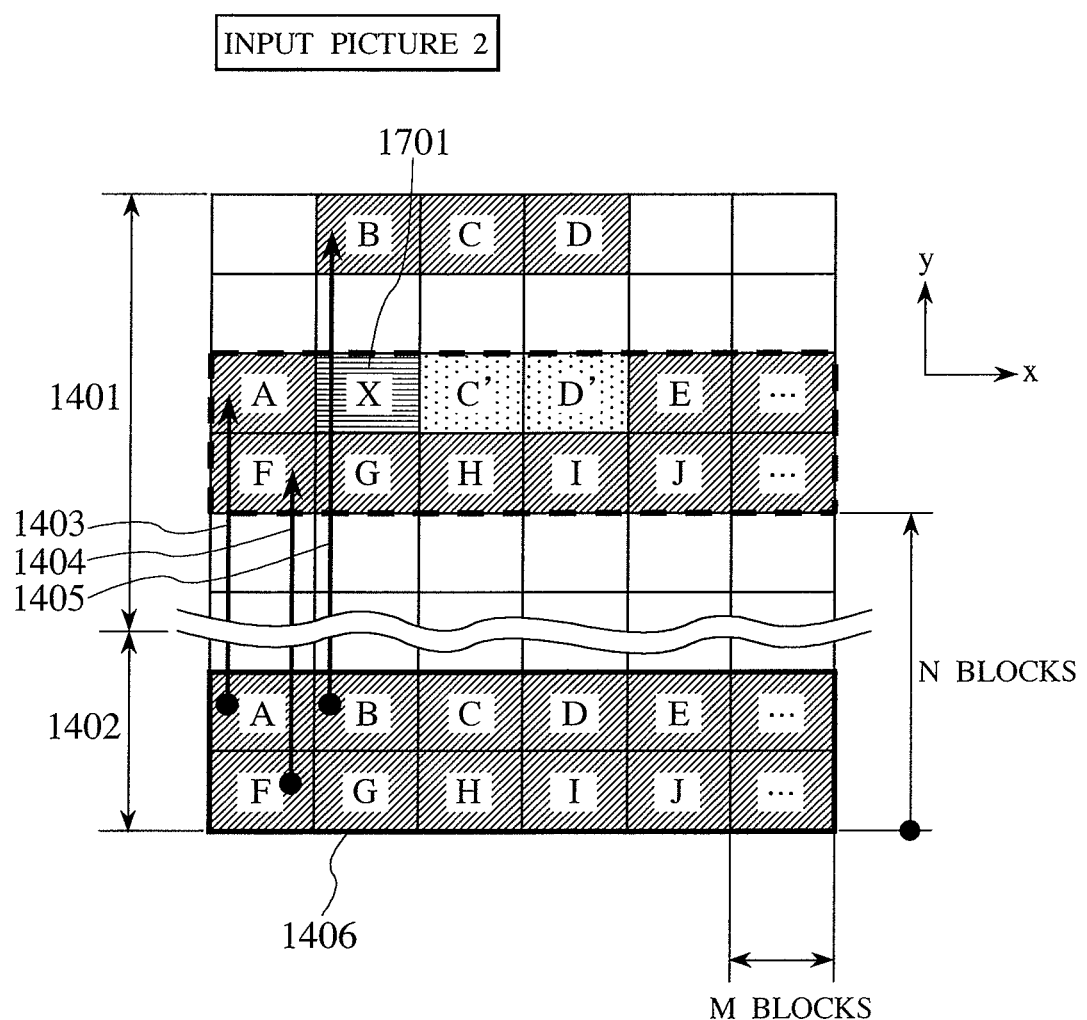
FIG. 10 is a diagram showing an example of an input picture according to the present embodiment.

Referring to FIG. 10, a component assigned the same symbol as that of FIG. 14 denotes the same component. Therefore, in an input picture 2 shown in FIG. 10, a block 1701 in the preceding frame is assigned a picture block X instead of the picture block B' of FIG. 14. Here, unlike the picture block B', the picture block X has a very large amount of differential data of differential picture, representing a difference from the picture block B.

That is, like the input picture 1, the current frame of the input picture 2 of FIG. 10 includes a rectangular block group 1406 which is composed of a first block group (blocks B, C, and D) including a plurality of blocks having a first motion vector and a second block group (blocks A, D, E, G, H, I, J, etc.) including a plurality of blocks having a second motion vector.

Further, like the input picture 1, the preceding frame of the input picture 2 of FIG. 10 includes the same picture as that of each block in the second block group, at a position separated from the counterpart in the second block group in the current frame by a distance of the second motion vector, and includes the same picture as that of each block in the first block group, at a position separated from the counterpart in the first block group in the current frame by a distance of the first motion vector.

Further, unlike the input picture 1, the preceding frame of the input picture 2 of FIG. 10 includes pictures (blocks C' and D'), each having a small difference from the counterpart in the first block group in the current frame, at a position separated from the counterpart in the first block group in the current frame by a distance of the second motion vector, and includes a picture (X) having a large difference from the counterpart in the first block group in the current frame, at a position separated from the counterpart in the first block group in the current frame by a distance of the second motion vector.

Figure 11:
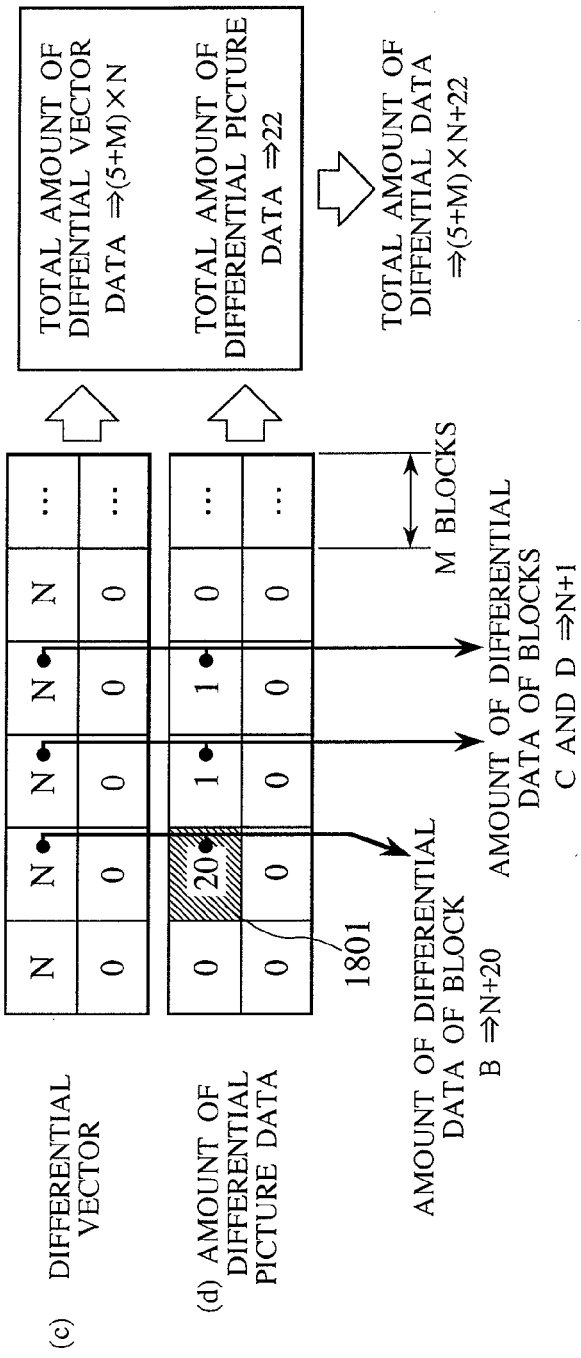
FIG. 11 is a diagram showing an example of an output result according to the present embodiment.

When replacement of the representative vector shown in (a) of FIG. 9 is performed for the input picture 2 of FIG. 10, (a) motion vector data, (b) prediction vector (mv_pred) data, (c) differential motion vector data, and (d) differential picture data are as shown in FIG. 11.

(a) motion vector data, (b) prediction vector (mv_pred) data, and (c) differential motion vector data which are included in the data of FIG. 11 (hereafter referred to as "output result 3") are the same as those of FIG. 9. However, for (d) differential picture data in FIG. 11, the amount of differential picture block for a block 1801, i.e., a picture block B in the current frame has increased. In the example of this FIG. 11, the amount of differential picture data for the picture block B is 20.

Here, as shown in (a) of FIG. 11, the amount of data has increased because the prediction picture for the picture block B in the current frame has become a picture block X in the preceding frame by the replacement of motion vectors having a size of N+2 with a representative vector having a size of N for the picture block B in the current frame.

In this case, with the output result 3 shown in FIG. 11, the total amount (sum of absolute values) of (c) differential motion vector data is (5+M)N, and the total amount (sum of absolute values) of (d) differential picture data is 22. Therefore, the total amount of differential data generated by the coding processing is (5+M)N+22. This means that, if nothing is done, the total amount of differential data will become larger than that for the conventional coding processing, (5+M)N+10.

When the motion picture recording apparatus 1303 is the motion picture recording apparatus 1200 according to the present embodiment, for an input signal with which the total amount of differential data will become larger than that for the conventional coding processing if each motion vector in the similar motion area is replaced with a representative motion vector, change is made to the conventional coding processing for the similar motion area by performing the selection processing for each similar motion area shown in FIG. 7. Therefore, when the input picture 2 shown in FIG. 10 is inputted to the motion picture recording apparatus 1303, the results of analysis by the information processing apparatus 1306 are not the output result 3 shown in FIG. 11 but the output result 1 shown in FIG. 8.

With the above-mentioned selection processing, the motion picture recording apparatus 1200 according to the present embodiment can prevent an increase in the amount of differential data even if an image is inputted, with which the amount of differential data will increase after each motion vector is replaced with a representative vector.

Although the above-mentioned operation has been explained in relation to the motion picture recording apparatus 1200 according to the present embodiment, the same relation as the relation between an input picture and an output result also applies to the operation only by the encoder 150 included in the motion picture recording apparatus 1200.

However, the encoder 150 according to the present embodiment may be hardware including the units shown in FIG. 1, and it is also possible that the control unit 160 shown in FIG. 1 attain the operation of each unit in cooperation with the software stored in the memory unit 170. Therefore, there are cases where the encoder 150 according to the present embodiment is a software encoder 1301 and where it is a hardware encoder 1302.

Therefore, in FIG. 13, the same relation as the relation between an input picture and an output result of the motion picture recording apparatus 1200 applies to the following case.

More specifically, in the case of the software encoder 1301, the information processing apparatus 1305 generates picture signal data (composed of a binary file, for example) applicable to the software encoder 1301, and the software encoder 1301 performs picture coding processing. Then, coding streams outputted from the software encoder 1301 are inputted to the information processing apparatus 1306. Finally, the information processing apparatus 1306 analyzes motion vector data, amount of data, etc. in the inputted coding streams. Also, the same relation as the relation between an input picture and an output result of the motion picture recording apparatus 1200 applies to this case.

Further, in the case of the hardware encoder 1302, the information processing apparatus 1305 generates picture signal data (composed of a binary file, for example) and a reproducing apparatus 1307 converts the data to a signal suitable for the hardware encoder 1302. The resultant signal is inputted to the hardware encoder 1302 for picture coding processing. Then, coding streams outputted from the hardware encoder 1302 are inputted to the information processing apparatus 1306. Finally, the information processing apparatus 1306 analyzes motion vector data, amount of data, etc. in the inputted coding streams. Also, the same relation as the relation between an input picture and an output result of the motion picture recording apparatus 1200 applies to this case.

The above-mentioned encoder included in the motion picture recording apparatus according to the present embodiment sets up similar motion areas based on the degree of the motion vector similarity for blocks to be subjected to coding, by use of the conventional prediction vector generation method, and uses a common motion vector for each set area.

Thus, it becomes possible to reduce the amount of generated codes for motion vectors, thereby attaining an encoder which generates encoded data that can be decoded even by a decoder supported by an existing coding standard with higher compression efficiency.

Further, a method of using a common motion vector for each area having a similar motion vector is compared with the conventional motion compensation method and then a suitable method is selected. This makes it possible to more reduce the total amount of generated codes (amount of data after picture coding) as compared with the conventional method.

Further, the encoder included in the motion picture recording apparatus according to the present embodiment sets up similar motion areas based on the degree of the motion vector similarity for blocks subjected to coding, by use of the conventional prediction vector generation method, and uses a common motion vector for each set area.

Thus, it becomes possible to reduce the amount of generated codes for motion vectors, thereby generating encoded data that can be decoded even by a decoder supported by an existing coding standard with higher compression efficiency.

Further, the above-mentioned motion picture recording apparatus 1200 according to the present embodiment performs picture coding processing of inputted coding streams with high compression efficiency. This makes it possible to generate coding streams having a smaller amount of data than coding streams separated by the demultiplexer unit 1203, thus reducing the amount of data accumulated in the accumulation unit 1210. Even when data is to be recorded with the same picture quality as a conventional case, the motion picture recording apparatus 1200 according to the present embodiment makes it possible to increase the recording time in comparison with the conventional case where coding streams separated by the demultiplexer unit 1203 are accumulated as they are.

Further, the motion picture recording apparatus 1200 according to the present embodiment may include a hard disk drive (magnetic disk) or a flash memory (semiconductor recording medium) as the accumulation unit 1210 to configure the motion picture recording apparatus 1200 as a recorder. Such a configuration makes it possible to perform recording processing of the hard disk drive (magnetic disk) or flash memory (semiconductor recording medium) with high compression efficiency. This makes it possible to attain a recorder that enables prolonged recording even with the hard disk drive (magnetic disk) or flash memory (semiconductor recording medium) without increasing the capacity.

Further, the motion picture recording apparatus 1200 according to the present embodiment may include a removable media read/write unit 1214 which performs write and read processing of coded image data for a removable medium 1215 shown in FIG. 12, instead of the accumulation unit 1210. Recording and reproduction operations of the removable media read/write unit 1214 are performed through the recording and reproduction control unit 1209. In this case, it becomes possible to perform motion picture recording of the removable medium 1215 with sufficient compression efficiency, thus attaining a motion picture recording apparatus which uses the capacity of the removable medium 1215 more suitably.

Further, an output unit 1216 shown in FIG. 12 may be provided in addition to the picture output unit 1206 and audio output unit 1207 which output data after decoding. In this case, the recording and reproduction control unit 1209 may obtain the coding streams coded by the encoder 150 and accumulated in the accumulation unit 1210 and then output the same from the output unit 1216 to an external apparatus. In this case, the motion picture recording apparatus 1200 functions as a picture compression apparatus which makes it possible to output coding streams having a smaller amount of data than the conventional coding technique with the same picture quality, thus saving communication bands to be outputted to an external apparatus.

Further, the motion picture recording apparatus according to the present embodiment sets up similar motion areas based on the degree of the motion vector similarity for blocks subjected to coding by use of the conventional prediction vector generation method, and uses a common motion vector for each set area. Thus, it becomes possible to reduce the amount of generated codes for motion vectors, thereby attaining a motion picture recording apparatus which generates encoded data that can be decoded even by a decoder supported by an existing coding standard with higher compression efficiency.

In accordance with the above-mentioned motion picture recording apparatus according to the present embodiment, it is possible to reduce the amount of data after picture coding when an inputted picture signal is recorded in the accumulation unit, thereby improving the compression efficiency. This makes it possible to attain, for example, a motion picture recording apparatus that enables prolonged motion picture recording.

Further, in accordance with the motion picture recording apparatus according to the present embodiment, it is possible to attain a motion picture recording apparatus which makes it possible to output a small amount of encoded data that can be decoded even by a decoder conforming to an existing coding standard.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications as fall within the ambit of the appended claims.

What is claimed is:

1. A motion picture recording method which performs coding processing of an input picture through inter prediction to record a motion picture, the method comprising:
    performing a block-based motion search for the input picture to calculate a motion vector of each block;
    setting up blocks having a similar motion vector as a similar motion area, by comparing the motion vector of a previously coded block with the motion vector of a block to be subjected to coding, the similar motion vector included in each motion vector calculated in the block-based motion search;
    calculating a representative motion vector by use of a motion vector provided by each block included in the similar motion area set up in the similar motion area;
    selecting either the representative motion vector or the motion vector provided by each block, so as to reduce the amount of generated codes regarding the motion vector, as a selected motion vector which is to be used for each block in the similar motion area;
    generating encoded data by use of the selected motion vector and a prediction picture of each block generated using the selected motion vector, for each block in the similar motion area; and
    calculating, as a block-based cost calculation, a coding cost for each block when the motion vector calculated in the block-based motion search step is used; and calculating, as a similar motion area cost calculation, a coding cost for each similar motion area when the representative motion vector is used;

wherein, based on the result of a comparison of a sum total of coding costs of the plurality of blocks calculated in the block-based cost calculation with the coding cost of the similar motion area calculated in the similar motion area cost calculation, for a plurality of blocks included in the similar motion area, the selecting determines which of the respective motion vector calculated in the representative motion vector calculation and the motion vector provided by each block is to be used, for each block in the similar motion area.

2. The motion picture recording method according to claim 1, wherein:

the selecting replaces the motion vector of each block in the similar motion area with the representative motion vector, when the use of the representative motion vector is selected as the selected motion vector for each block in the similar motion area.

3. The motion picture recording method according to claim 1, wherein:

based on a difference between a motion vector of the block of the input picture and a motion vector of a block adjacent to the block, the similar motion area setup step determines whether or not the block is to be included in the same similar motion area as that of the adjacent block.

4. The motion picture recording method according to claim 1, wherein:

the representative motion vector calculation regards an output vector derived by a function, having motion vectors provided by a plurality of blocks included in the similar motion area as variables, as a representative motion vector for the similar motion area.

5. The motion picture recording method according to claim 4, wherein:

the output vector derived by a function, having motion vectors provided by a plurality of blocks included in the similar motion area as variables, is a vector derived by an average or median of the x and y components of motion vectors provided by a plurality of blocks included in the similar motion area.

6. A motion picture recording method which performs coding processing of an input picture through inter prediction to record a motion picture, the method comprising:

performing a block-based motion search for the input picture to calculate a motion vector of each block;

setting up blocks having a similar motion vector as a similar motion area, by comparing the motion vector of a previously coded block with the motion vector of a block to be subjected to coding, the similar motion vector included in each motion vector calculated in the block-based motion search;

calculating a representative motion vector by use of a motion vector provided by each block included in the similar motion area set up in the similar motion area;

selecting either the representative motion vector or the motion vector provided by each block, so as to reduce the amount of generated codes regarding the motion vector, as a selected motion vector which is to be used for each block in the similar motion area;

generating encoded data by use of the selected motion vector and a prediction picture of each block generated using the selected motion vector, for each block in the similar motion area; and calculating, as a block-based cost calculation, a coding cost for each block when the motion vector calculated in the block-based motion search step is used;

calculating, as a similar motion area cost calculation, a coding cost for each similar motion area when the representative motion vector is used;

wherein, based on the result of a comparison of a sum total of coding costs of the plurality of blocks calculated in the block-based cost calculation with the coding cost of the similar motion area calculated in the similar motion area cost calculation, for a plurality of blocks included in the similar motion area, the selecting determines which of the respective motion vector calculated in the representative motion vector calculation and the motion vector provided by each block is to be used, for each block in the similar motion area;

if the coding cost for the similar motion area is smaller than the sum total of the coding costs of the plurality of blocks, the selecting replaces the motion vector of each block in the similar motion area with the representative motion vector.

7. A motion picture recording apparatus which codes and records an input, the apparatus comprising:

an input unit constructed of at least one of at least part of a hardware processor and circuitry, and configured to input the input picture;

an encoder constructed of at least one of at least part of a hardware processor and circuitry, and configured to input picture inputted from the input unit; and an accumulation unit constructed of at least one of at least part of a hardware processor and circuitry, and configured to accumulate an image signal coded by the encoder;

wherein the encoder is further configured to:

perform a block-based motion search for the input picture, to calculate a motion vector of each block;

set up blocks having a similar motion vector as a similar motion area, by comparing a motion vector of a previously coded block with a motion vector of a block to be subjected to coding;

calculate a representative motion vector by use of the motion vector provided by each block included in the similar motion area; and select, as a selected motion vector, either the representative motion vector or the motion vector provided by each block, so as to reduce the amount of generated codes regarding the motion vector, which is to be used for each block in the similar motion area;

wherein the selected motion vector and a prediction picture of each block generated using the selected motion vector are outputted, and coding processing is performed using the selected motion vector and the prediction picture, for each block in the similar motion area;

the perform the block-based motion search calculates a coding cost of each block when a moving vector further calculated is used;

the calculate the representative motion vector calculates a coding cost of each similar motion area when the representative motion vector is used; and the selection unit determines whether or not the representative motion vector is to be used based on a result of a comparison of a sum total of the coding cost of each block calculated by the block-based motion search, with the coding cost of the similar motion area, for a plurality of blocks included in the similar motion area.

8. The motion picture recording apparatus according to claim 7, wherein:
the select operation replaces the motion vector of each block in the similar motion area with the representative motion vector, when the use of the representative motion vector for the similar motion area is selected.

9. The motion picture recording apparatus according to claim 7, wherein:
the encoder is configured, based on a difference between a motion vector of the block of the input picture and a motion vector of a block adjacent to the block, to determine whether or not the block is to be included in the same similar motion area as that of the adjacent block.

10. The motion picture recording apparatus according to claim 7, wherein:
the encoder is configured to consider an output vector derived by a function, having motion vectors provided by a plurality of blocks included in the similar motion area as variables, as a representative motion vector for the similar motion area.

11. The motion picture recording apparatus according to claim 10, wherein:
the output vector derived by a function, having motion vectors provided by a plurality of blocks included in the similar motion area as variables, is a vector derived by an average or median of the x and y components of motion vectors provided by a plurality of blocks included in the similar motion area.

* * * * *